United States Patent
Aubert Guyon et al.

(10) Patent No.: US 10,554,047 B2
(45) Date of Patent: Feb. 4, 2020

(54) CONTROL METHOD OF AN ELECTRIC MICROGRID

(71) Applicant: Schneider Electric Industries SAS, Rueil-Malmaison (FR)

(72) Inventors: Caroline Aubert Guyon, Crolles (FR); Jean Dobrowolski, Sassenage (FR); Yann Herriot, Voiron (FR)

(73) Assignee: Schneider Electric Industries SAS, Rueil-Malmaison (FR)

(*) Notice: Subject to any disclaimer, the term of this patent is extended or adjusted under 35 U.S.C. 154(b) by 312 days.

(21) Appl. No.: 15/378,662

(22) Filed: Dec. 14, 2016

(65) Prior Publication Data

US 2017/0187188 A1 Jun. 29, 2017

(30) Foreign Application Priority Data

Dec. 23, 2015 (FR) ...................... 15 63186

(51) Int. Cl.
*H02J 7/34* (2006.01)
*H02J 1/10* (2006.01)
(Continued)

(52) U.S. Cl.
CPC .............. *H02J 3/382* (2013.01); *H02J 3/383* (2013.01); *H02J 3/386* (2013.01); *H02J 3/48* (2013.01);
(Continued)

(58) Field of Classification Search
CPC .. H02J 3/382; H02J 3/383; H02J 3/386; H02J 3/48; H02J 3/50; H02J 3/42; H02M 7/44
(Continued)

(56) References Cited

U.S. PATENT DOCUMENTS

2011/0163603 A1* 7/2011 Chou ...................... H02J 3/381
307/66

2014/0097683 A1* 4/2014 Piyabongkarn ........... H02J 3/32
307/26
(Continued)

FOREIGN PATENT DOCUMENTS

WO WO 2015/102598 A1 7/2015

OTHER PUBLICATIONS

French Preliminary Search Report dated Jul. 27, 2016 in French Application 15 63186, filed on Dec. 23, 2015 ( with English translation of Categories of Cited Documents).

Mohammad S. Alotibe et al. "Simplified Voltage and Frequency Controller Based on Droop Control for the Dynamic Analysis of a Microgrid", Universities Power Engineering Conference, 2012, 8 pages.

(Continued)

*Primary Examiner* — Rexford N Barnie
*Assistant Examiner* — Toan T Vu
(74) *Attorney, Agent, or Firm* — Oblon, McClelland, Maier & Neustadt, L.L.P.

(57) ABSTRACT

The invention relates to a method for controlling an electrical microgrid (1) comprising a renewable power source (3), delivering, to the microgrid (1), a first power that is controlled by droop control, and capable of synchronously operating in parallel with a synchronous power source (2), the synchronous source (2) being capable of generating a second power that is also delivered to the microgrid (1), according to a criterion for the automatic start/stop of said synchronous power source, the method comprising the starting of the synchronous source as soon as the frequency and/or the voltage of the microgrid (1) are lower than a threshold frequency and/or a threshold voltage, respectively, and the stopping of the synchronous source as soon as the second power is lower than a threshold power.

10 Claims, 4 Drawing Sheets

(51) Int. Cl.
| | |
|---|---|
| *H02J 3/38* | (2006.01) |
| *H02J 3/48* | (2006.01) |
| *H02J 3/50* | (2006.01) |
| *H02M 7/44* | (2006.01) |
| *H02J 3/42* | (2006.01) |

(52) U.S. Cl.
CPC .............. *H02J 3/50* (2013.01); *H02M 7/44* (2013.01); *H02J 3/42* (2013.01)

(58) Field of Classification Search
USPC .......................................................... 307/52
See application file for complete search history.

(56) References Cited

U.S. PATENT DOCUMENTS

| | | | | |
|---|---|---|---|---|
| 2014/0249686 A1* | 9/2014 | Brainard | ............... | G05B 13/02 700/286 |
| 2016/0329713 A1* | 11/2016 | Berard | ...................... | H02J 3/24 |

OTHER PUBLICATIONS

Evangelos Rikos et al. "Stability and Power Quality Issues in Microgrids Under Weather Disturbances", IEEE Journal of Selected Topics in Applied Earth Observations and Remote Sensing, vol. 1, No. 1, 2008, 10 pages.

Shuai Lu et al. "Control Strategies for Distributed Energy Resources to Maximize the Use of Wind Power in Rural Microgrids", Power and Energy Society General Meeting, 2011, 8 pages.

Chengshan Wang et al. "Cooperative Operation and Optimal Design for Islanded Microgrid", Innovative Smart Grid Technologies, 2012, 8 pages.

Mohsen Nemati et al. "Frequency and Voltage Control in Microgrids: Modeling and Simulations in Islanded Mode", IEEE Pes Innovative Smart Grid Technologies, 2014, 6 pages.

Daming Zhang et al. "Integration of Renewable Energy Generation With Conventional Diesel-Engine Powered Generation in a Microgrid" 2015 IEEE PES Asia-Pacific Power and Energy Engineering Conference, 2015. 5 pages.

* cited by examiner

CONTROL METHOD OF AN ELECTRIC MICROGRID

TECHNICAL FIELD

The invention relates to a method for controlling an electrical distribution microgrid.

PRIOR ART

A microgrid is generally a local electrical grid intended to distribute electrical power in regions that are isolated and far from large electrical energy generation centres. Isolated regions are, for example, islands, mountainous regions or desert areas.

The main advantage of microgrids is that they operate autonomously (in islanded mode, without connection to the mains grid) and are located in proximity to the areas of consumption (the loads). Thus, the losses inherent to long-distance distribution grids are limited.

The energy autonomy of the microgrid is generally ensured by various types of electrical power sources, of which engine-generators play an important role (synchronous power sources are spoken of in this case). Specifically, from an economic point of view, an engine-generator represents a small initial investment and provides for electricity generation that is flexible enough to absorb spikes in consumption at peak times. However, their operation requires large quantities of diesel fuel, which consequently increases the energy bill as well as adding to atmospheric pollution.

In order to overcome these environmental and economic problems, microgrids may be hybrid and may also comprise renewable power sources such as photovoltaic power sources, wind power sources, etc. Renewable power sources generally comprise an electricity generation system that delivers a DC electrical signal, and an inverter intended to convert the DC electrical signal to an AC electrical signal before it is delivered to the microgrid.

However, unless the operating mode of their inverters is modified, renewable power sources are not able to form the grid (they are not "grid forming"), and consequently cannot by themselves generate all the electricity supplying the grid.

In order to overcome this limitation, renewable power sources may comprise an inverter controlled by a control law allowing them to form the grid. Stated otherwise, the renewable power source may impose the voltage and frequency of an electrical signal on an electrical grid without recourse to a reference signal. However, as soon as the load of the microgrid has extra power consumption requirements, the inverter of the renewable power source generally reacts before the synchronous power source, and attempts to deliver all of the power that it generates. This results in a phase shift between the electrical signals delivered by the renewable power source and by the synchronous power source, thus potentially creating a major fault in the microgrid (blackout).

Moreover, as renewable power sources are subject to the vagaries of climate, and are consequently an unstable power source, they are then qualified as intermittent power sources.

Thus, for reasons of stability of the hybrid microgrid, the proportion of renewable power sources may not exceed a value of between 20 and 30% (the degree of penetration of renewable energy is spoken of) such that at least one engine-generator is in continuous operation. This therefore limits achievable savings.

Thus, hybrid microgrids comprising a proportion of renewable power sources that is greater than 30% are unstable. One aim of the invention is then to propose a method for controlling a hybrid microgrid that allows the proportion of renewable power sources to be increased without affecting the stability of said grid.

SUMMARY OF THE INVENTION

The invention relates to a method for controlling an electrical distribution microgrid comprising at least one renewable power source, delivering, to the microgrid, a first active/reactive power that is controlled by droop control according to a frequency and a voltage of the microgrid, respectively, and capable of synchronously operating in parallel with a synchronous power source, the synchronous power source being capable of generating a second active/reactive power that is also delivered to the microgrid, according to a criterion for the automatic start/stop of said synchronous power source, the method comprising the starting of the synchronous power source as soon as the frequency and/or the voltage of the microgrid are lower than a threshold frequency and/or a threshold voltage, respectively, and the stopping of the synchronous power source as soon as the second power is lower than a threshold power.

According to one embodiment, the renewable power source comprises an inverter capable of emulating the operation of a synchronous power source, such that the renewable power source behaves as a synchronous power source.

According to one embodiment, the threshold frequency and the threshold voltage are parametrized in a computer program controlling the synchronous power source.

According to one embodiment, the droop control according to frequency and voltage is characterized by an open-circuit frequency $f_0$ and an open-circuit voltage $V_0$, respectively, the open-circuit frequency $f_0$ and the open-circuit voltage $V_0$ being liable to be within a predetermined open-circuit frequency range $H_{f0}$ and a predetermined open-circuit voltage range $H_{v0}$, respectively.

According to one embodiment, the renewable power source comprises a power accumulation system comprising a reserve of active/reactive power, said system being intended to deliver active/reactive power to the microgrid.

According to one embodiment, the inverter adjusts the frequency and/or the voltage of the signal delivered to the microgrid according to a power and/or energy reserve of the renewable power source. According to one embodiment, the inverter also adjusts the frequency and/or the voltage of the signal delivered to the microgrid according to meteorological forecasts and/or on forecast energy consumption.

According to one embodiment, the frequency and the voltage of the microgrid are continuously measured by the synchronous power source.

According to one embodiment, the at least one renewable power source comprises a plurality of renewable power units, the plurality of renewable power units sharing the generation of the first power between them, and operating synchronously.

According to one embodiment, the at least one synchronous power source comprises a plurality of synchronous power sources.

BRIEF DESCRIPTION OF THE DRAWINGS

Other features and advantages will become apparent from the following description of modes of implementation of the method for controlling an electrical distribution microgrid according to the invention, which modes are given by way of non-limiting example and described with reference to the appended drawings in which.

DETAILED DESCRIPTION OF PARTICULAR EMBODIMENTS

Figure 1:
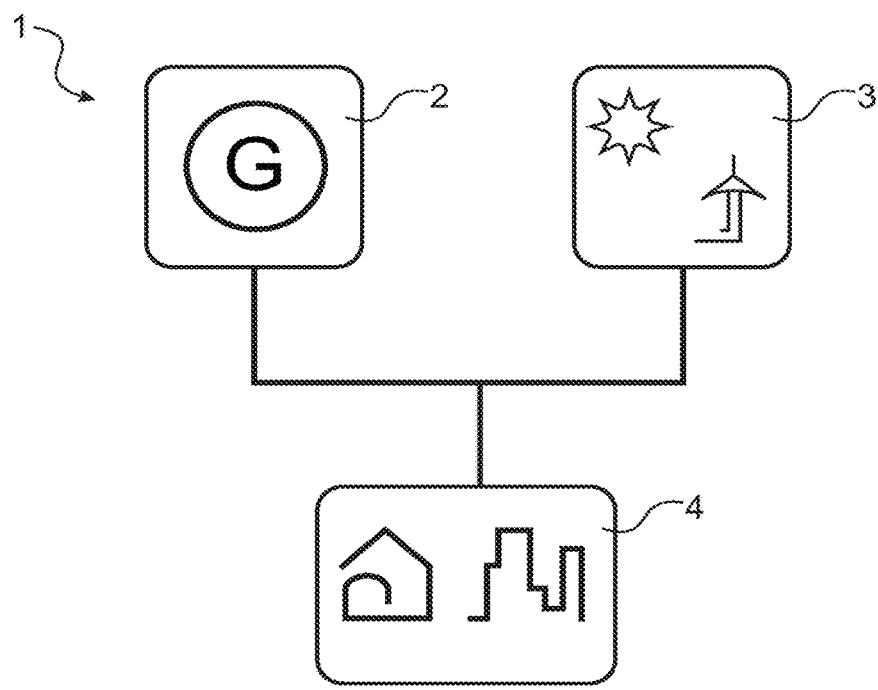
FIG. 1 is a schematic representation of a microgrid according to the invention.

FIG. 1 represents an electricity distribution microgrid 1 according to the invention.

An electricity distribution microgrid 1 may comprise power sources such as renewable power sources 3 and synchronous power sources 2.

Throughout the rest of the description, the term power is equated to relative power (as a percentage). That is to say, that the proportion of the power delivered by a source (a renewable power source 3 or a synchronous power source 2) with respect to the maximum power generated is spoken of thereby.

The renewable power source 3 may comprise a renewable electricity generation system, a power accumulation system and an inverter. The renewable electricity generation system may comprise solar power generators (photovoltaic panels), wind power generators (wind turbines) or water current power generators (water turbines), which generally generate a DC electrical signal. The inverter is capable of converting the electrical signal generated by the electricity generation system to an AC electrical signal before it is injected into the microgrid 1. The power accumulation system may comprise a capacitor (or, more particularly, a supercapacitor), a flywheel, an electrochemical battery, etc. The term supercapacitor means a capacitor employing a particular technology that allows a power density and an energy density that is intermediate between conventional electrolytic capacitors and batteries to be obtained. For example, a supercapacitor may have a power density of between 1000 and 5000 W/kg, and an energy density of between 4 and 6 Wh/kg.

Synchronous power sources 2 generally comprise a synchronous motor (an alternator) that, when rotationally driven by a shaft of a rotating machine, generates an AC electrical signal (an electric current and a voltage). The rotating machine may comprise a diesel motor or a turbine (a gas, water, steam or air turbine).

The microgrid 1 also comprises loads 4 that are intended to consume, at least partly, a power delivered by the renewable power sources 3 and the synchronous power sources 2.

In order to be electrically connected together, advantageously in parallel, to the microgrid 1, the various power sources must each be capable of delivering an electrical signal of the same frequency and the same voltage.

Figure 2A:
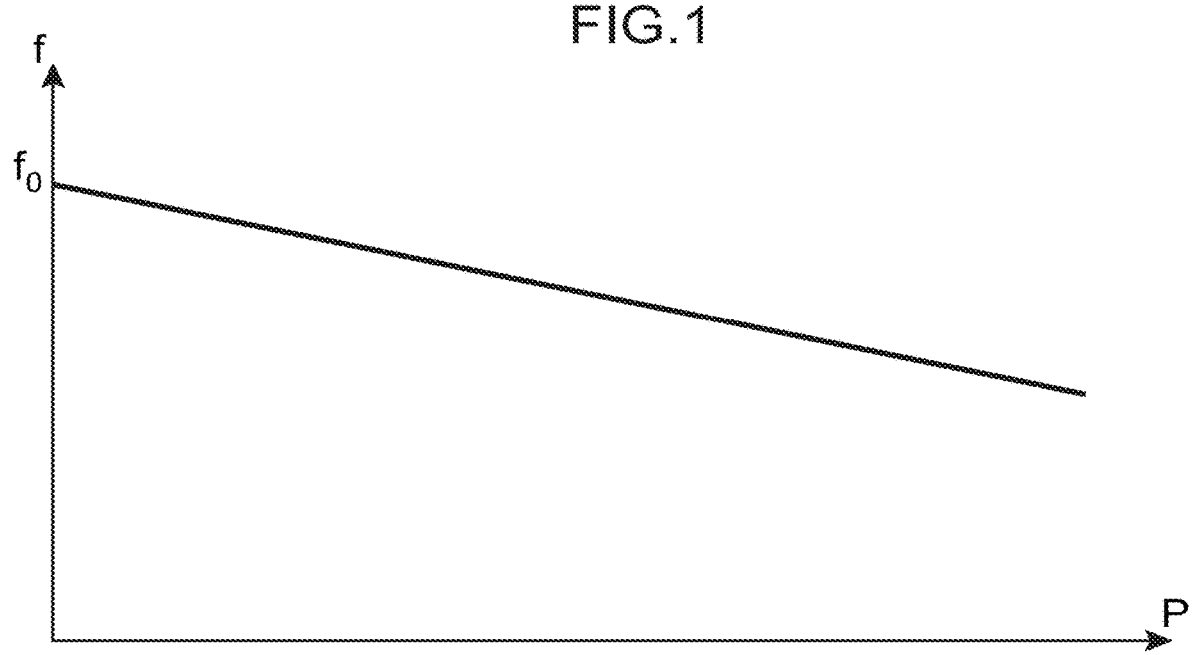
FIG. 2a is a graph representing the frequency (along the vertical axis) of an electrical signal delivered by a synchronous power source as a function of the active power (along the horizontal axis) delivered by said source.

In this regard, the synchronous power source 2 is taken as an example. The synchronous power source 2 is capable of adjusting the frequency of the electrical signal that it delivers to the microgrid 1 depending on the active power consumed by said microgrid 1 and generated by the synchronous power source 2. This behaviour is illustrated in FIG. 2a. The frequency f varies according to a linear function of the relative active power P (as a percentage) delivered by the synchronous power source 2. The linear function is characterized by a slope D and an open-circuit frequency $f_0$. The open-circuit frequency $f_0$ corresponds to the frequency of the electrical signal delivered by the synchronous power source 2 when the load consumes no active power from said source 2. The slope D is referred to as "droop". Power controlled by droop control according to the frequency of the microgrid 1 is also spoken of. By virtue of a speed regulator, the synchronous power source 2 adjusts its speed of rotation (and hence the frequency of the electrical signal delivered to the microgrid) depending on the power that it delivers.

Figure 2B:
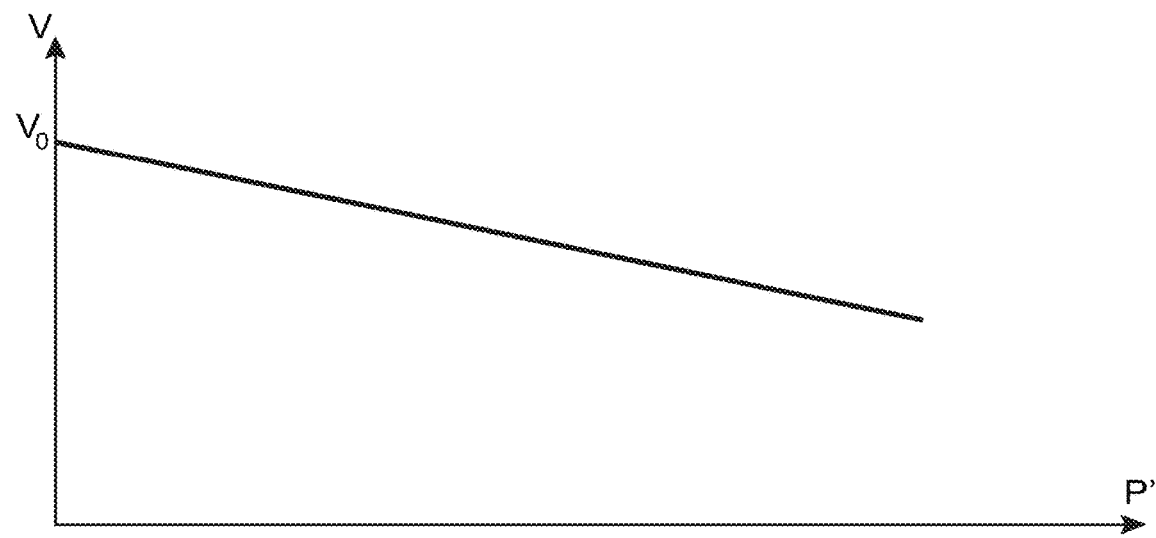
FIG. 2b is a graph representing the voltage (along the vertical axis) of an electrical signal delivered by a synchronous power source as a function of the reactive power (along the horizontal axis) delivered by said source.
Figure 2C:
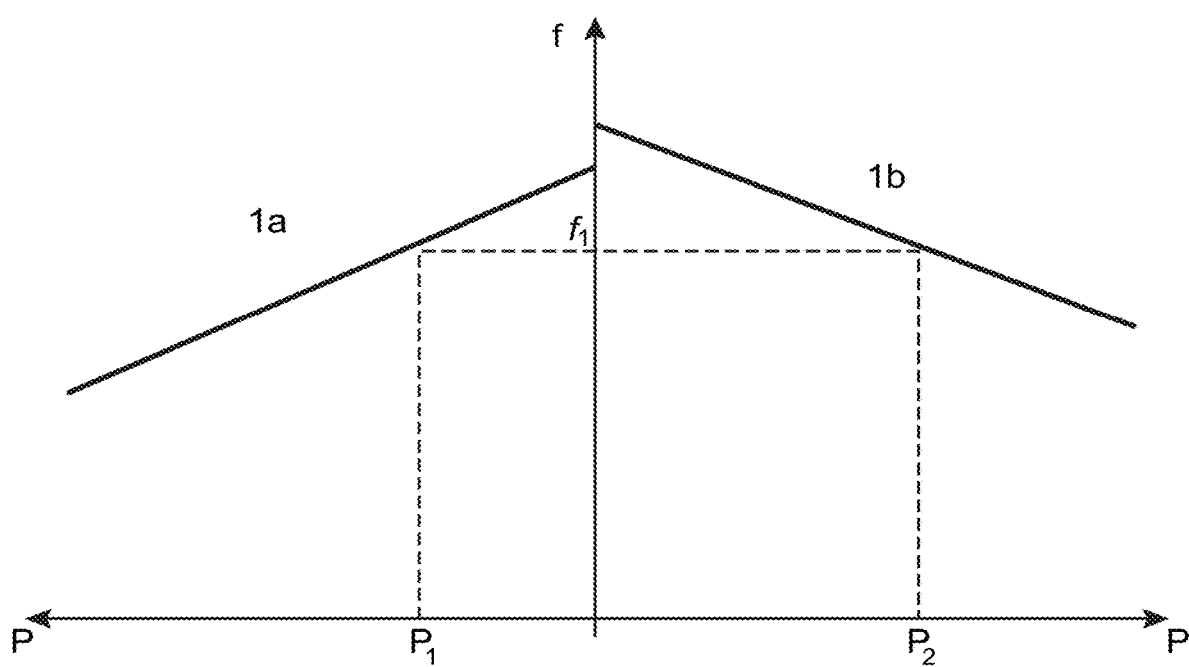
FIG. 2c is a graph representing the frequency (along the vertical axis) of an electrical signal delivered by two synchronous power sources as a function of the active power (along the horizontal axis) delivered by said sources.

In an equivalent manner, the synchronous power source is capable of adjusting the voltage of the electrical signal that it delivers to the microgrid according to the reactive power consumed by said microgrid 1 and generated by the synchronous power source 2. This behaviour is illustrated in FIG. 2b. The voltage V varies according to a linear function of the relative reactive power P' (as a percentage) delivered by the synchronous power source 2. The linear function is characterized by a slope D' and an open-circuit voltage $V_0$. The open-circuit voltage $V_0$ corresponds to the voltage of the electrical signal delivered by the synchronous power source 2 when the load consumes no reactive power from said source 2. The slope D' is also referred to as "droop". Power controlled by droop control according to the voltage of the microgrid 1 is also spoken of. Multiple synchronous power sources 2 controlled by droop control according to a same droop share the load 4 between them in proportion to the active/reactive power that they are able to deliver. Furthermore, under these conditions, all of the synchronous power sources 2 deliver an electrical signal of substantially the same frequency. For example, as shown in FIG. 2c, two synchronous power sources 1a and 1b may operate in parallel and deliver an electrical signal of frequency $f_1$, the source 1a and the source 1b then each supplying the microgrid 1 with an active power equal to $P_1$ and $P_2$, respectively.

The adjustment of the droop according to the frequency (adjustment of the slope D) of the synchronous power source 2 may be carried out according to the design of said source, e.g. by adjusting a potentiometer, or by using an electronic interface (a computer and software, for example).

The adjustment of the droop according to the voltage (adjustment of the slope D') of the synchronous power source 2 may be carried out according to the design of said source, e.g. by adjusting a potentiometer, or by using an electronic interface (a computer and software, for example).

In the context of the present invention, the applicant has made the decision to electrically connect renewable power sources 3 and synchronous power sources 2 in parallel to supply power to a microgrid 1, and to favour the generation of the electrical active/reactive power generated by the renewable power sources 3 over the synchronous power sources 2.

In the prior art, renewable power sources 3 represent, in general, only a standby source, and they consequently need to be rethought to achieve this objective.

Thus, according to the invention, a renewable power source 3 comprises a renewable electricity generation system. Said renewable power generation system 3 may be of an intermittent nature, namely generating power irregularly. The renewable power generation system 3 may comprise, for example, photovoltaic panels, wind turbines or water turbines. These generally generate a DC electrical signal which must be converted to an AC electrical signal before being delivered to the microgrid 1. The renewable power source 3 is consequently equipped with an inverter that is capable of carrying out this conversion of the DC electrical signal to an AC electrical signal.

In a particularly advantageous manner, the renewable power source 3 behaves as a synchronous power source 2. Thus the virtual generator concept, which is known to those skilled in the art, needs to be introduced. The renewable power source comprises a control law allowing it to reproduce the electrical and mechanical behaviour of a synchronous generator 2 and, more particularly, an engine-generator.

Thus, in this regard, the inverter of the renewable power source 3 is controlled by a control law such that the renewable power source 3 behaves as a synchronous power source 2. A virtual generator is spoken of.

The inverter is, additionally, subject to a control law in order to confer droop control on the renewable power source 3 comprising said inverter. The frequency and the voltage of the electrical signal delivered by the renewable power source 3 therefore follow the behaviour in terms of active P and reactive P' power, respectively, illustrated in FIGS. 2a and 2b. The control law may be imposed in software form, comprising the adjustment of an increase in the frequency of the electrical signal as a function of the active power, and/or of an increase in the voltage of the electrical signal as a function of the reactive power. The aforementioned increases are none other than the slopes D and D' of the linear functions of FIGS. 2a and 2b.

Figure 3:
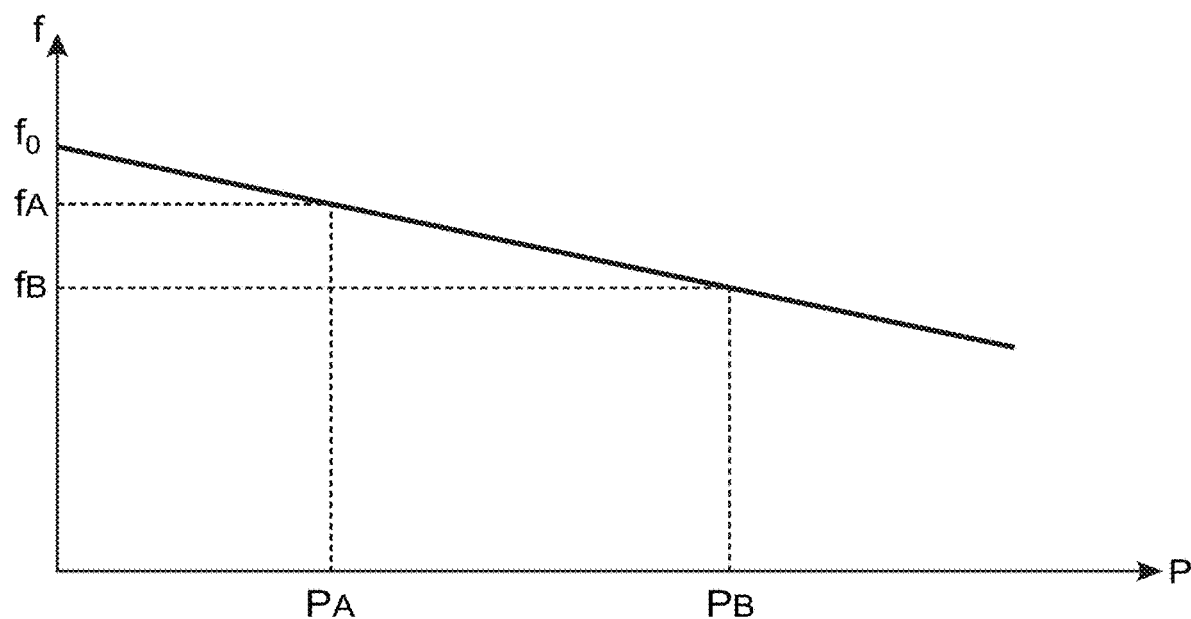
FIG. 3 shows the variation in the frequency f (on the vertical axis) of the electrical signal delivered to the microgrid as a function of the variation in the active power (on the horizontal axis) delivered to the load.

Thus, the renewable power source 3 may adjust the power delivered to the microgrid 1 by adjusting the frequency of the electrical signal. As shown in FIG. 3, at a first instant, the load consumes an active power $P_A$ of an electrical signal of frequency $f_A$ delivered by the renewable power source 3. At a second instant, extra power might be required for the load 4 to operate. The renewable power source 3 then adjusts the frequency of the electrical signal that it delivers to the microgrid 1 to a frequency $f_B$ in order to meet the power requirement $P_B$ of the load 4.

Figure 4:
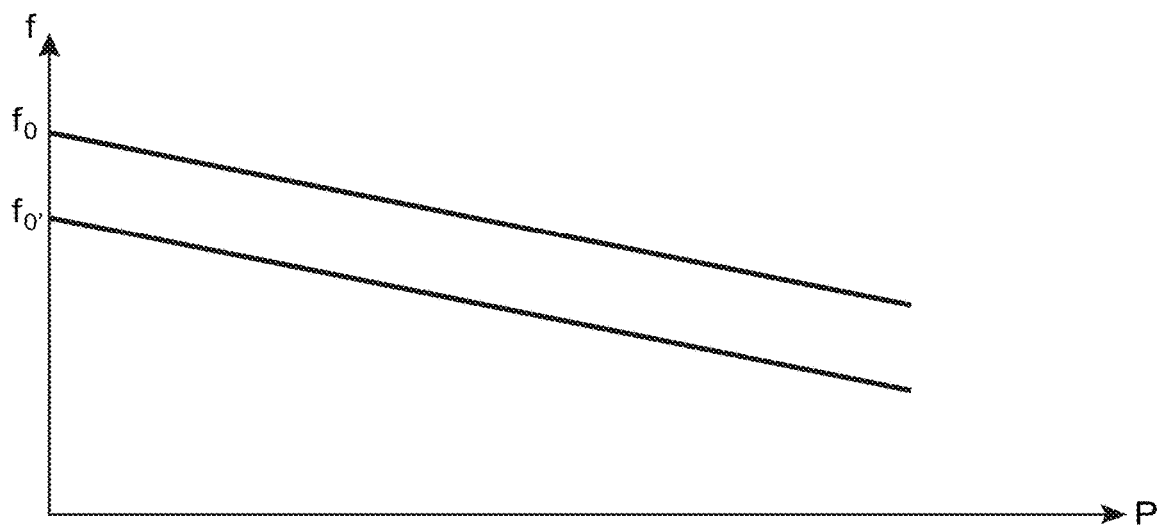
FIG. 4 shows the variation in characteristic frequency (vertical axis)/active power (horizontal axis) caused by a corrective action taken when faced with a modification of the power sharing carried out between the sources, namely in order to voluntarily modify the frequency while retaining the same operating point in terms of power.

According to another specific case, shown in FIG. 4, the power generation by the renewable power source 3 between a first instant and a second instant is seen to decrease. The renewable power source 3 adjusts its open-circuit frequency $f_0$ to a new open-circuit frequency $f_{0'}$ that is lower than the open-circuit frequency $f_0$. The maximum power that the renewable power source 3 is able to deliver remains unchanged, but will be delivered at a lower frequency.

The emulation of a virtual generator by the renewable power source 3 allows the latter to be electrically connected in parallel to a synchronous power source 2.

Furthermore, under such conditions, the renewable power source 3 may, as would be the case with a synchronous power source 2, form the grid (i.e. be grid forming). Forming the grid is understood to mean supplying the grid with electrical power without having recourse to a reference electrical signal delivered by another source.

Thus, the synchronous power sources 2 and the renewable power sources 3 may be connected in parallel and deliver an electrical signal to the microgrid 1 of the same frequency.

In a particularly advantageous manner, the renewable power source 3 may comprise a power accumulation system, for example a capacitive system such as a supercapacitor, or a flywheel.

Again in an advantageous manner, the renewable electricity generation system and the power accumulation system are electrically connected to the inverter.

Conversely, when the renewable electricity generation system generates a surplus of power that is not consumed by the microgrid 1, said surplus may advantageously be stored in the power accumulation system.

Again in an advantageous manner, the power accumulation system may also serve as a power and/or energy reserve.

The operation of a microgrid 1 comprising a synchronous power source 2 and a renewable power source 3 emulating a virtual generator as described above will now be described.

The renewable power source 3 and the synchronous power source 2 are electrically connected in parallel to the microgrid 1.

The renewable power source 3 is capable of delivering, to the microgrid 1, a first active/reactive power that is controlled by droop control according to the frequency and the voltage of the electrical signal of the microgrid 1.

The synchronous power source 2 and the renewable power source 3, electrically connected in parallel, advantageously have the same droop, e.g. a descending slope of between 1 and 5% and preferably of between 1.5 and 3%.

In a particularly advantageous manner, the frequency and the voltage of the electrical signal liable to be delivered by the renewable 3 and synchronous 2 power sources are continuously measured.

Again in an advantageous manner, the measurement of the frequency and of the voltage is carried out by the synchronous power source 2.

The frequency may be measured on the electrical signal of the microgrid by the synchronous power source 2.

The frequency may also be measured by imaging the speed of rotation of the shaft of the synchronous power source 2.

The measurement of the frequency and of the voltage is also carried out by the renewable power source 3.

The renewable power source 3 delivers a first active/reactive power to the microgrid 1.

The frequency of the electrical signal delivered by the renewable power source 3 is controlled by droop control according to the active power consumed by the microgrid 1.

The voltage of the electrical signal delivered by the renewable power source 3 is controlled by droop control according to the reactive power consumed by the microgrid 1. The synchronous power source 2 is capable of delivering a second active/reactive power to the microgrid 1.

More particularly, the renewable power source 3 may be the only power source to deliver an electrical signal to the microgrid 1. By alone in delivering an electrical signal, what is meant is that a single renewable power source is connected to the microgrid 1, or that the renewable power source 3 is the only one, out of a plurality of power sources, to deliver an electrical signal to the microgrid 1. This condition means that the frequency and the voltage of the electrical signal are dependent on the power consumed by the microgrid 1 (or, more particularly, the load 4).

In the event of a plurality of renewable power sources 3 delivering an electrical signal to the microgrid, said sources will share the load 4 between them. In this regard, let us consider the case of a first renewable power source and a second renewable power source. The first and the second renewable power source deliver an electrical signal of the same frequency and the same voltage, and share the load 4 between them. By sharing the load 4, what is meant is that the sum of the active/reactive powers delivered by the first and the second renewable power source is equal to the active/reactive power consumed by said load 4. This behaviour is the same as that illustrated in FIG. 2c and relative to two synchronous power sources 2.

The active/reactive power delivered by a renewable power source 3, for example the first renewable power source, may also require a downward adjustment, for example an adjustment due to decreased generation. The first renewable power source is then obliged to lower the open-circuit voltage and/or frequency in order to account for its new state. However, the second renewable power source may be able to make up for the shortcoming of the first renewable power source such that the sum of the powers delivered by the two renewable power sources is equal to the power consumed by the load. The second renewable power source may make up for the shortcoming of the first source by increasing its open-circuit voltage and/or frequency, or by lowering the operating voltage and/or frequency. This line of reasoning may be extended to more than two renewable power sources.

The generation of the second active/reactive power is subject to a criterion for starting/stopping the generation of said second active/reactive power by the synchronous power source 2.

The criterion for starting the generation of the second active/reactive power is based on the measurement of the frequency and the voltage of the electrical signal supplying power to the microgrid 1.

It is considered, in a first instance, that the microgrid 1 is supplied only with the first power. Stated otherwise, the synchronous power source 2 generates no electrical power. It is assumed that extra active power is required for the operation of the load 4 of the microgrid 1. The extra active power required for the operation of the load 4 may be due to an increase in the power consumption of the load 4 (see FIG. 3) and/or a variation (decrease) in the available power generated by the renewable power source 3 (see FIG. 4). The renewable power source 3 then adjusts the frequency of the electrical signal that it delivers in order to balance the first active power against the active power consumed by the load 4. Thus, the frequency of the electrical signal is decreased.

The extra active power consumed by the load 4 may be delivered by the renewable electricity generation system or by the power accumulation system. The extra power consumed by the load 4 of the grid may also exceed the power generation of the renewable power source 3. The synchronous power source 2 is therefore turned on in order to address overconsumption of active power by the load 4 that the renewable power source 3 is unable to deliver. Thus, according to the present invention, a threshold frequency value of the electrical signal, below which the synchronous power source 2 starts generating the second active power and delivers it to the microgrid 1, is defined.

The threshold frequency may be defined as the frequency from which the renewable electricity generation system delivers an active power that is for example 50% higher, or else for example 70% higher, than the power that it generates. The remaining 50% (or 30%) of power generated by the renewable electricity generation system then constitutes a safety margin. The inverter of the renewable power source 3 may be parametrized using techniques known to those skilled in the art so that the renewable power source 3 delivers a signal with a frequency that is lower than the threshold frequency as soon as the renewable electricity generation system delivers an active power that is e.g. 50% higher, or else e.g. 70% higher, than the power that it generates.

Figure 5A:
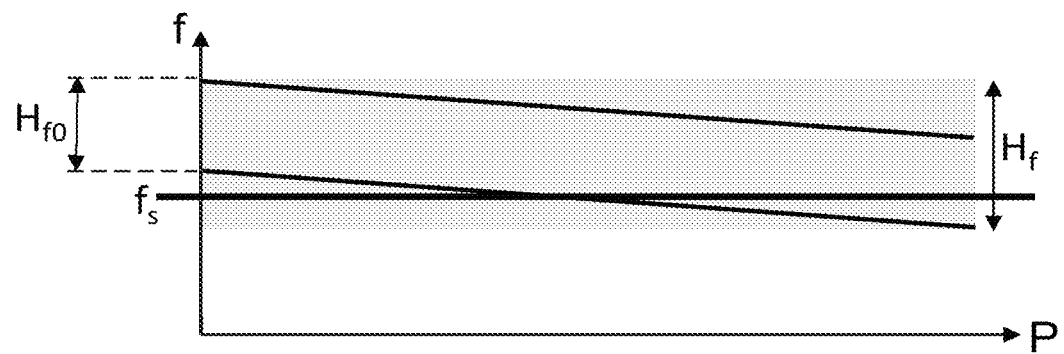
FIG. 5a is an illustration of the adjustment in the open-circuit frequency $f_0$ (given on the vertical axis of the figure) in the range of open-circuit frequencies ($H_{f0}$), the range of open-circuit frequencies ($H_{f0}$) being restricted to the predetermined range of frequencies ($H_f$) and imposed by the operator of the microgrid.

In an alternative and advantageous manner, the renewable power source 3 comprises a power accumulation system. The power accumulation system comprises an energy reserve. In the case of a power accumulation system comprising a supercapacitor, the energy reserve takes the form of a charge state. The inverter is capable of being programmed in order to automatically adjust the frequency of the electrical signal delivered to the microgrid 1 according to various criteria such as the available energy reserve, the power generation possible at time t, production forecasts or meteorological forecasts. Furthermore, the inverter is capable such that the open-circuit frequency $f_o$ is within a predetermined open-circuit frequency range $H_{f0}$, such that the frequency resulting from operation is also within a predetermined frequency range $H_f$. For example, the predetermined open-circuit frequency range $H_{f0}$ is imposed by an operator of the microgrid 1. As illustrated in FIG. 5a, the predetermined frequency range $H_f$ responds thus to a grid code. The open-circuit frequency $f_o$ is then bound within a more restricted range $H_{f0}$, in order to ensure that the frequency (even at full load) remains within the permissible frequency range $H_f$, potentially with a safety margin. Thus, if the power reserve of the renewable power source is decreased, the open-circuit frequency $f_o$ also decreases. The threshold frequency $f_s$ is not necessarily reached (if the power delivered is too low for example), and the one or more synchronous power sources 2 are not started as long as it is not necessary. Voluntarily modifying the frequency does not necessarily involve falling below the threshold frequency. The threshold frequency $f_s$ may thus be defined as the frequency below which the operator considers the active power reserve no longer to be sufficient to ensure the stability of the network. The criterion may be set by the operator and or the designer of the microgrid 1. The operator of the microgrid may then require the active power reserve always to be above a threshold active power.

The threshold active power reserve may advantageously be defined as the active power that must be delivered to the microgrid in the starting phase, of duration T, of the synchronous power source 2. More particularly, the threshold active power reserve may be defined as a percentage of the maximum load 4 that may be present on the microgrid 1. Regarding the synchronous power source 2, it is configured to start as soon as the frequency of the electrical signal of the microgrid 1 falls below the threshold frequency.

In an equivalent manner, let us assume that extra reactive power is required for the operation of the load 4 of the microgrid 1. The renewable power source 3 then adjusts the voltage of the electrical signal that it delivers in order to balance the first reactive power against the reactive power consumed by the load 4. Thus, the voltage of the electrical signal is decreased.

The extra reactive power consumed by the load 4 may be delivered by the renewable electricity generation system or by the power accumulation system. The extra reactive power consumed by the load 4 of the grid may also exceed the reactive power generation of the renewable power source 3. The synchronous power source 2 is therefore turned on in order to address overconsumption of reactive power by the load 4 that the renewable power source 3 is unable to deliver.

Thus, according to the present invention, a threshold voltage value of the electrical signal, below which the synchronous power source 2 starts generating the second reactive power and delivers it to the microgrid 1, is defined.

The threshold voltage may be defined as the voltage from which the renewable electricity generation system delivers a reactive power that is for example 50% higher, or else for example 70% higher, than the power that it generates. The remaining 50% (or 30%) of power generated by the renewable electricity generation system then constitutes a safety margin. The inverter of the renewable power source 3 may be parametrized using techniques known to those skilled in the art so that the renewable power source 3 delivers a signal with a voltage that is lower than the threshold frequency as soon as the renewable electricity generation system delivers a reactive power that is e.g. 50% higher, or else e.g. 70% higher, than the power that it generates.

Figure 5B:
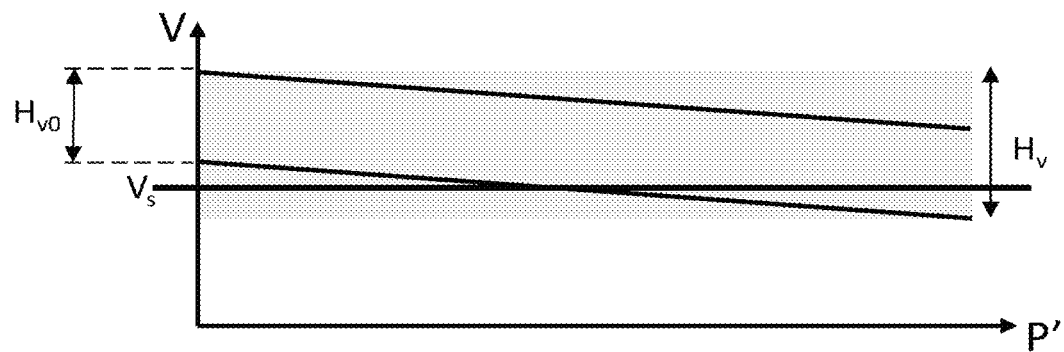
FIG. 5b is an illustration of the adjustment in the open-circuit voltage $V_0$ (given on the vertical axis of the figure) in the range of open-circuit voltages ($H_{v0}$), the range of open-circuit voltages ($H_{v0}$) being restricted to the predetermined range of frequencies ($H_v$) and imposed by the operator of the microgrid.

In an alternative and advantageous manner, the renewable power source 3 comprises a power accumulation system. The inverter is capable of being programmed in order to automatically adjust the voltage of the electrical signal delivered to the microgrid 1 according to various criteria such as the available energy reserve, the power generation possible at time t, production forecasts or meteorological forecasts. Furthermore, the inverter capable is such that the open-circuit voltage $V_O$ is within a predetermined open-circuit voltage range $H_{vO}$, such that the voltage resulting from operation is also within a predetermined voltage range $H_v$. For example, the predetermined open-circuit voltage value range is imposed by an operator of the microgrid 1. As illustrated in FIG. 5*b*, the voltage range $H_v$ responds thus to a grid code. The open-circuit voltage $V_O$ is then bound within a more restricted range $H_{vO}$, in order to ensure that the voltage (even at full load) remains within the permissible voltage range $H_v$, potentially with a safety margin.

Thus, if the reserve is decreased, the open-circuit voltage $V_O$ also decreases. The threshold voltage $V_s$ is not necessarily reached (if the reactive power delivered is too low for example), and the one or more synchronous power sources 2 are not started as long as it is not necessary. Voluntarily modifying the voltage does not necessarily involve falling below the threshold voltage. The threshold voltage $V_s$ may thus be defined as the voltage below which the operator considers the reactive power reserve no longer to be sufficient to ensure the safety of the network. The criterion may thus be set by the operator and or the designer of the microgrid 1. The operator of the microgrid 1 may then require the reactive power reserve always to be above a threshold reactive power. The threshold reactive power reserve may advantageously be defined as the reactive power that must be delivered to the microgrid in the starting phase, of duration T, of the synchronous power source 2. More particularly, the threshold reactive power reserve may be defined as a percentage of the maximum load 4 that may be present on the microgrid 1.

Regarding the synchronous power source 2, it is configured to start as soon as the voltage of the electrical signal of the microgrid 1 falls below the threshold voltage.

Thus, the synchronous power source 2 starts generating the second active/reactive power as soon as the frequency and/or the voltage of the electrical signal of the microgrid 1 is lower than the threshold frequency and the threshold voltage, respectively.

Conversely, the load 4 may decrease its active/reactive power consumption such that the active/reactive power delivered by the renewable power source 3 would be sufficient for the microgrid 1 to operate in a stable manner.

According to the invention, a threshold active/reactive power, consumed by the load 4, below which the synchronous power source 2 stops generating the second active/reactive power, is defined.

As soon as the active power to the microgrid 1 is lower than a threshold active power value, the synchronous power source 2 stops generating second active power.

The threshold active/reactive power is predetermined and is parametrized in a control system of the synchronous power source 2 via techniques known to those skilled in the art.

Thus, according to the invention, the synchronous power source 2 may start or stop generating the second active/reactive power according to the consumption requirements of the load 4 of the microgrid 1 without requiring communication between the renewable 3 and synchronous 2 power sources or when communication is defective. Starting and stopping generation of the second active/reactive power are solely based on the measurement of the voltage, the frequency and the active/reactive power of the signal on the microgrid 1 by the synchronous power source 2.

Thus, according to the invention, it is possible to favour the generation of power by the renewable power source 3. Stated otherwise, the synchronous power source 2 starts generating the second power only when the first power is no longer sufficient, or risks no longer being sufficient, for the operation of the load 4.

For example, a renewable power source 3 comprising a renewable electricity generation system, e.g. a photovoltaic power system, does not function at night, and is advantageously complemented by an engine-generator in order to ensure continuous generation of electricity. Furthermore, during a spike in active/reactive power consumption by the load 4, the first power delivered by the renewable power source 3 may become insufficient. The synchronous power source 2, according to the criteria established by the present invention, may start generating the second active/reactive power and allow a balance to be struck between power generated by the power sources and the power consumed by the load 4.

The present invention is not limited to one renewable power source 3, and may comprise a plurality of renewable power sources 3 emulating a virtual generator. The renewable power sources 3 feature droop control according to the frequency and voltage of the active and reactive powers, such that the renewable power sources 3 share the load 4 between them. The plurality of renewable power sources 3 is configured to deliver the first power to the microgrid 1.

The invention may also comprise a plurality of synchronous power sources 2, electrically connected in parallel to the microgrid 1.

Thus, advantageously, the degree of penetration of renewable energy may exceed the 30% limit. By virtue of the concepts introduced in the present invention, the renewable power sources may be sized so as to provide 100% of the power consumption of the load 4. Specifically, when all of the conditions are met for the renewable power sources to sufficiently generate (by conditions to be met, what is meant is sufficient sunlight/sunshine for photovoltaic panels, sufficient wind for wind turbines, etc.) the power consumed by the load 4, the initiation of the synchronous power sources 2 is not necessary. The power accumulation systems included in each renewable power source 3 then allow fluctuations in the power generated by the renewable power sources to be mitigated and thus stability of the electrical signal delivered to the microgrid 1 to be ensured. Furthermore, the power accumulation systems also allow the intermittent nature of said renewable power sources 3 to be mitigated. Specifically, as soon as the generation of the electrical power delivered by the renewable electricity generation system falls to a value that is lower than the requirements of the load 4, the power accumulation systems may take over for a first duration. The first duration may then be used for starting the one or more synchronous power sources 2, and reaching a steady state.

In a particularly advantageous manner, the power accumulation system may deliver active/reactive power to the microgrid 1 in order to compensate for fluctuations in power generated by the renewable power source without having to start a synchronous power source 2. Generation alone might not be sufficient, but the accumulation system is able to add a certain amount of power. As soon as generation becomes slightly higher than the consumption of the load 4 (due to fluctuations), the accumulation system is charged and may again be used without reaching the minimum charge state involving a decrease in the parameter $f_0$.

The microgrid 1 is advantageously without a system for communication between the various power generation sources, and may be controlled in a completely automatic manner.

The invention is also particularly advantageous in the case where a communication system exists between the synchronous power source 2 and the renewable power source 3, but is defective. Specifically, the method according to the invention may be a standby solution allowing operation in downgraded mode while still retaining greater economic gains by virtue of the ability to favour the renewable power sources 3 when faced with a faulty communication system.

The renewable power sources 3 and the synchronous power sources 2 may also be remote.

The invention claimed is:

1. A method for controlling an electrical distribution microgrid comprising
at least one renewable power source, delivering to the microgrid a first active/reactive power that is controlled by droop control according to a frequency and a voltage of the microgrid, respectively, and configured to synchronously operate in parallel with at least one synchronous power source, the synchronous power source being configured to generate a second active/reactive power that is also delivered to the microgrid according to a criterion for automatic start/stop of the synchronous power source, the method comprising:
starting the synchronous power source as soon as the frequency or the voltage of the microgrid are lower than a threshold frequency or a threshold voltage, respectively; and
after the starting of the synchronous power source, stopping the synchronous power source as soon as the second active/reactive power is lower than a threshold power, wherein
the starting and the stopping of the synchronous power source are performed when communication between the renewable power source and the synchronous power source is defective.

2. The method according to claim 1, further comprising emulating, by an inverter included in the renewable power source, an operation of a synchronous power source, such that the renewable power source behaves as a second synchronous power source.

3. The method according to claim 2, further comprising parametrizing the threshold frequency and the threshold voltage by a computer controlling the synchronous power source.

4. The method according to claim 1, wherein the droop control according to frequency and voltage includes an open-circuit frequency $f_0$ and an open-circuit voltage $V_0$, respectively, the open-circuit frequency $f_0$ and the open-circuit voltage $V_0$ being liable to be within a predetermined open-circuit frequency range $H_{f0}$ and a predetermined open-circuit voltage range $H_{v0}$, respectively.

5. The method according to claim 1, wherein the renewable power source comprises a power accumulation system comprising an energy reserve, the power accumulation system being configured to deliver active/reactive power to the microgrid.

6. The method according to claim 2, further comprising adjusting, by the inverter, the frequency or the voltage of the signal delivered to the microgrid according to a power or energy reserve of the renewable power source.

7. The method according to claim 6, further comprising adjusting, by the inverter included in the renewable power source, the frequency or the voltage of the signal delivered to the microgrid according to meteorological forecasts or on forecast energy consumption.

8. The method according to claim 1, further comprising continuously measuring, by the synchronous power source, the frequency and the voltage of the microgrid.

9. The method according to claim 1, wherein the at least one renewable power source comprises a plurality of renewable power units, the plurality of renewable power units sharing the generation of the first power between them, and operating synchronously.

10. The method according to claim 1, wherein the at least one synchronous power source comprises a plurality of synchronous power sources.

* * * * *